United States Patent
Dufour et al.

(10) Patent No.: US 8,548,050 B2
(45) Date of Patent: Oct. 1, 2013

(54) VIDEO CODING METHOD WITH SELECTABLE BLACK AND WHITE MODE

(75) Inventors: Cecile Dufour, Paris (FR); Gwenaelle Marquant, Paris (FR); Stephane Edouard Valente, Paris (FR)

(73) Assignee: Koninklijke Philips N.V., Eindhoven (NL)

( * ) Notice: Subject to any disclaimer, the term of this patent is extended or adjusted under 35 U.S.C. 154(b) by 1943 days.

(21) Appl. No.: 10/208,361

(22) Filed: Jul. 30, 2002

(65) Prior Publication Data
US 2003/0043921 A1   Mar. 6, 2003

(30) Foreign Application Priority Data
Aug. 2, 2001 (EP) .................................. 01402092

(51) Int. Cl.
*H04N 7/12* (2006.01)
*H04N 11/02* (2006.01)
*H04N 11/04* (2006.01)

(52) U.S. Cl.
USPC .................................................. 375/240.12

(58) Field of Classification Search
USPC ................ 375/240.12; 348/393.1, 394.1
See application file for complete search history.

(56) References Cited

U.S. PATENT DOCUMENTS

| | | | |
|---|---|---|---|
| 5,198,898 A | 3/1993 | Miyata | |
| 5,523,860 A | 6/1996 | Takei et al. | |
| 6,608,935 B2 | 8/2003 | Nagumo et al. | |
| 2002/0012394 A1 * | 1/2002 | Hatano et al. | 375/240.02 |
| 2004/0028129 A1 * | 2/2004 | Nagumo et al. | 375/240.08 |
| 2004/0126030 A1 * | 7/2004 | Lin et al. | 382/246 |

FOREIGN PATENT DOCUMENTS

| | | |
|---|---|---|
| EP | 0868092 A2 | 9/1998 |
| EP | 0961499 A1 | 12/1999 |
| EP | 1075148 A2 | 7/2000 |
| JP | 2000023193 A | 1/2000 |
| WO | 9912343 A2 | 3/1999 |
| WO | WO 0150766 A1 * | 7/2001 |

OTHER PUBLICATIONS

Definition of 'tangible'; Merriam-Webster Online available at www.mirriam-webster.com/.*
Standard Operating Procedures 2; Board of Patent Appeals and Interferences available at http://www.uspto.gov/patents/process/appeal/stdproced.jsp.*
Standard MPEG-4: p. 134 of the MPEG-4 document w3056, also referenced "Information Technology—Coding of audio-visual objects—Part 2: Visual" ISO/IEC JTC1/SC239/WG11, Maui, USA, Dec. 1999.
Standard H.26L: p. 16, of the H.26L document Q15,K-59 "H.26L Test Model Long Term Nos. 5 (TML-5)-Draft 0", ITU-Telecommunications Standardization Section, 11th Meeting, Portland, Oregon, USA, Aug. 22-25, 2000.

* cited by examiner

*Primary Examiner* — Mehrdad Dastouri
*Assistant Examiner* — Jeremaiah C Hallenbeck-Huber

(57) ABSTRACT

A video coding method applied to an input signal consisting of a sequence of frames represented by one luminance matrix and two chrominance matrices generates a coded bitstream in which each data item is described by a bitstream syntax allowing any decoder to recognize and decode all the segments of the content of the bitstream. The syntax includes a flag provided for indicating at a high level description the presence, or absence, of chrominance components in the coded bitstream, and therefore allowing to deliver, at the decoding side, the information according to which chrominance descriptive elements have to be decoded, or not.

12 Claims, 1 Drawing Sheet

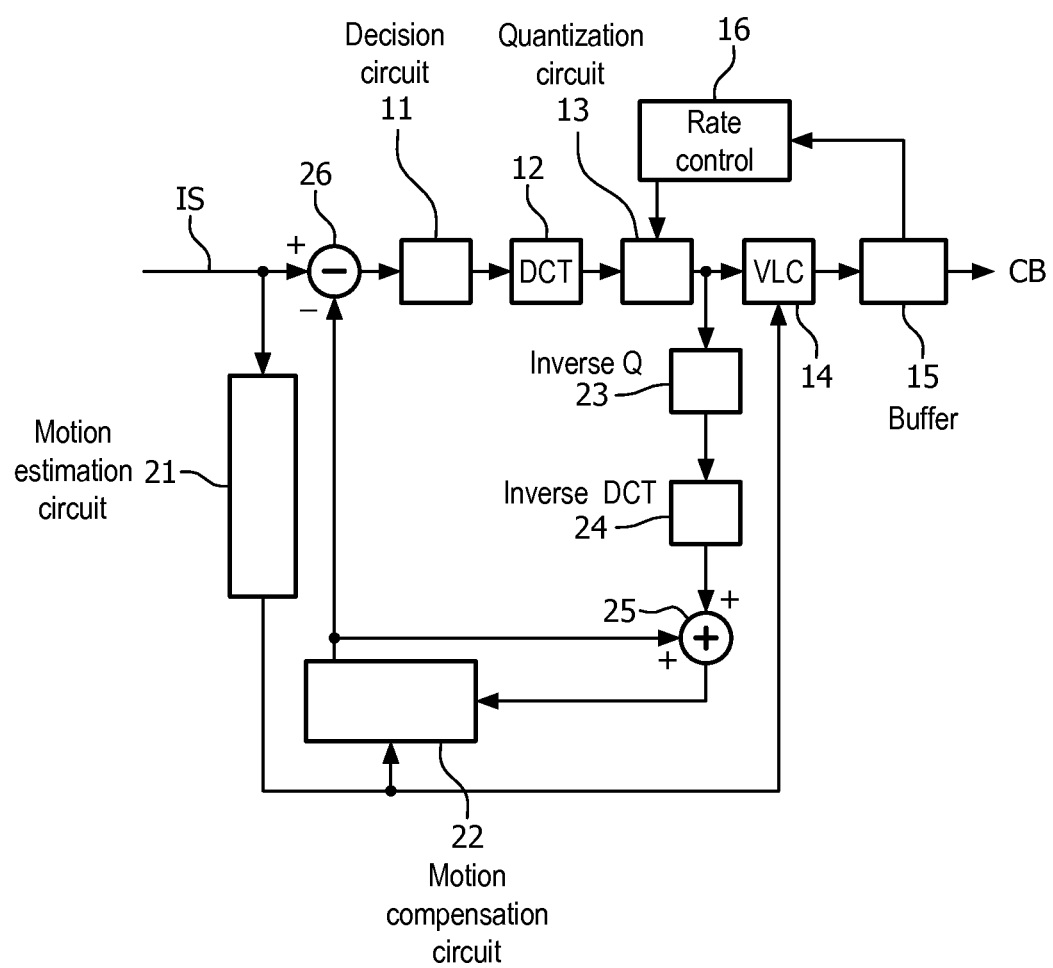

ized for coloured sequences. However, this table is not optimized for black and white sequences: only 16 CBP values out of 48 are actually used, and the shortest VLC words are reserved for CBP values that are never encountered. It is difficult to precisely quantify this waste of bits, but it obviously exists.
VIDEO CODING METHOD WITH SELECTABLE BLACK AND WHITE MODE

FIELD OF THE INVENTION

The present invention relates to the field of video compression and, for instance, more specifically to the video standards of the MPEG family (MPEG-1, MPEG-2, MPEG-4) and of the ITU-H.26X family (H.261, H.263 and extensions, H.26L). Said invention concerns a video coding method applied to a sequence of video frames and generating a coded bitstream in which each data item is described by means of a bitstream syntax allowing any decoder to recognize and decode all the segments of the content of said bitstream, each of said frames consisting of three rectangular matrices that are a luminance matrix and two chrominance ones.

The invention also relates to a device for carrying out said coding method, to a transmittable video signal delivered by such a coding device, to a video decoding method for decoding said transmittable signal, and to a corresponding decoding device.

BACKGROUND OF THE INVENTION

In the first video standards, the video is assumed to be rectangular and to be described in terms of three separate channels: one luminance channel and two chrominance channels. The luminance signal is carrying the varying black and white information on a given amount N of bits (eight bits for instance). Each of the two chrominance channels contains a digital signal equal to a value comprised in the range defined by a chrominance representation on a given amount M of bits (eight bits for instance: with such a representation on eight bits, the values of the signal may vary between 0 and 255). In case of an only black and white signal, each of the chrominance channels contains a flat signal equal to a constant value $2^{M-1}$. However, with the above-cited standards, the syntaxes describing the signals to be transmitted always assume that the video is "coloured". Although there are many video contents that are in black and white, said syntaxes force the transmission of chrominance descriptive elements which are not necessary.

The consequence of this lack of flexibility is a waste of bits, leading to a loss of coding efficiency illustrated for example in the case of the standards MPEG-4 and H.26L: (a) standard MPEG-4: as defined in page 134 of the MPEG-4 document w3056, also referenced "Information Technology—Coding of audio-visual objects
  Part 2: Visual", ISO/IEC JTC1/SC29/WG11, Maui, USA, December 1999, a variable length code, called dct_dc_size_chrominance, is used as a descriptive element encoding the size of the differential value that should be read from the transmitted or stored bitstream in order to update in the blocks of all intra macroblocks the last decoded chrominance DC coefficient and therefore obtain its current value. This differential value, equal to 0 when the chrominance signal is a constant value, is then encoded as "there is no differential value to be read" (i.e. dct_dc_size_chrominance=0), which results, as shown in the first line of Table B-14, p. 343, of said document, in a codeword of 2 bits per macroblock and per chrominance channel in I-pictures. For a CIF I-picture of size 352×288 pixels comprising 396 macroblocks, this leads consequently to a waste of bits of at least 396×2 channels×2 bits=1584 bits (at least, because, in fact, other syntatic elements can further degrade the coding efficiency and must also be taken into account in this evaluation).

(b) standard H.26L: as defined in page 16 of the H.26L document Q15-K-59 "H.26L Test Model Long Term Number 5 (TML-5)-Draft 0", ITU-Telecommunications Standardization Sector, 11th Meeting, Portland, Oreg., USA, Aug. 22-25, 2000, a so-called Coded Block Pattern (CBP) is used to indicate for any given 16×16 pixels macroblock which 8×8 blocks (for the luminance and for the chrominance) contain transform coefficients, i.e. in fact to indicate two kinds of information: which 8×8 luminance blocks were encoded in the bitstream (on 4 bits), and whether or not chrominance coefficients were encoded (3 possibilities, coded on 2 bits). This CBP element is then further encoded by variable length codes: the luminance and chrominance block patterns are jointly entropy-coded using a VLC table optimized for coloured sequences. However, this table is not optimized for black and white sequences: only 16 CBP values out of 48 are actually used, and the shortest VLC words are reserved for CBP values that are never encountered. It is difficult to precisely quantify this waste of bits, but it obviously exists.

SUMMARY OF THE INVENTION

It is therefore an object of the invention to propose a video coding method allowing to avoid such a waste of bits, and therefore to improve the coding efficiency.

To this end, the invention relates to a method such as defined in the introductory part of the description and which is moreover characterized in that said syntax comprises a flag indicating at a high description level the presence, or not, of chrominance components, and to a corresponding coding device.

The invention also relates to a transmittable video signal consisting of a coded bitstream generated by such a video coding method and in which each data item is described by means of a bitstream syntax allowing any decoder to recognize and decode all the segments of the content of said bitstream, each of said frames consisting of three rectangular matrices—a luminance one and two chrominance ones, said signal being characterized in that it comprises a syntactic element provided for indicating at a high description level the presence, or not, of chrominance components, and to a video decoder for receiving and decoding such a video signal.

The invention also relates to a video decoding method for decoding said transmittable video signal, and to a corresponding decoding device.

BRIEF DESCRIPTION OF THE DRAWING

The invention will now be described in a more detailed manner, with reference to the accompanying drawing in which:

FIG. 1 shows an example of an MPEG coder with motion compensated interframe prediction.

DETAILED DESCRIPTION OF THE INVENTION

To solve the problem of waste of bits explained above, it is proposed to introduce, whatever the type of standard considered, an additional syntactic element allowing to introduce more flexibility in these standards. This introduction is implemented by means of the addition, in the bitstream, at a high description level, equivalent for instance to the Video Object Layer (VOL) MPEG-4 level, of a specific signal, or flag, intended, according to the invention, to provide an indication on whether or not the chrominance signal should be encoded, at a level higher than macroblocks for MPEG or ITU standards, or, more generally, at a high description level.

This additional descriptive step is implemented for example in the following manner. A syntactic element is defined, such as, in the present case: Video_object_layer_chrom and the semantic meaning of this element is: "this is a one bit flag indicating, if set to a given value (for example, one), that the chrominance channel is present and should be decoded, and, if not, that both chrominance channels are set to the relevant monochrome constant value".

This technical solution is particularly advantageous, since it noticeably reduces the waste of bits by using means that are neither contemplated nor suggested in the standards. It must indeed be noted, for example in the MPEG-4 syntax, that there is also, in the document w3056 cited above, another syntactic element related to the chrominance, called "chroma_format" and given at the VOL level. From the semantic description given in Table 6-13, page 111, of this document, it can be seen that the format of the chrominance is given: 4:2:0, for example, or 4:2:2, or 4:1:1, but that the existence or not of the chrominance channel is not addressed.

The video coding method described above may be implemented in a coding device such as for instance the one illustrated in FIG. 1 showing an example of an MPEG coder with motion compensated interframe prediction, said coder comprising coding and prediction stages. The coding stage itself comprises a mode decision circuit 11 (for determining the selection of a coding mode I, P or B as defined in MPEG), a DCT circuit 12, a quantization circuit 13, a variable-length coding circuit 14, a buffer 15 and a rate control circuit 16. The prediction stage comprises a motion estimation circuit 21, a motion compensation circuit 22, an inverse quantization circuit 23, an inverse DCT circuit 24, an adder 25, and a subtractor 26 for sending towards the coding stage the difference between the input signal IS of the coding device and the predicted signal available at the output of the prediction stage (i.e. at the output of the motion compensation circuit 22). This difference is the bitstream that is coded, and the output signal CB of the buffer 15 is the coded bitstream that, according to the invention, will include the one bit flag indicating that the chrominance is, or not, present in the input signal and will have, or not, to be decoded at the decoding side.

Another example of coding device may be based on the specifications of the MPEG-4 standard. In the MPEG-4 video framework, each scene, which may consist of one or several video objects (and possibly their enhancement layers), is structured as a composition of these objects, called Video Objects (VOs) and coded using separate elementary bitstreams. The input video information is therefore first split into Video Objects by means of a segmentation circuit, and these VOs are sent to a basic coding structure that involves shape coding, motion coding and texture coding. Each VO is, in view of these coding steps, divided into macroblocks, that consist for example in four luminance blocks and two chrominance blocks for the format 4:2:0 for example, and are encoded one by one. According to the invention, the multiplexed bitstream including the coded signals resulting from said coding steps will include the one bit flag indicating that the chrominance is, or not, present in the input signal and will have, or not, to be decoded at the decoding side.

Reciprocally, this flag, transmitted to the decoding side, is read by appropriate means in a video decoder receiving the coded bitstream that includes said flag. The decoder, which is able to recognize and decode all the segments of the content of the coded bitstream, reads said additional syntactic information and knows that the chrominance channel is, or not, present and has therefore to be decoded, or not. Such a decoder may be of any MPEG-type, as the encoding device, and its essential elements are for instance, in series, an input buffer receiving the coded bitstream, a VLC decoder, an inverse quantizing circuit and an inverse DCT circuit. Both in the coding and decoding device, a controller may be provided for managing the steps of the coding or decoding operations.

The foregoing description of the preferred embodiments of the invention has been presented for purposes of illustration and description. It is not intended to be exhaustive or to limit the invention to the precise forms disclosed, and obviously modifications and variations, apparent to a person skilled in the art and intended to be included within the scope of this invention, are possible in light of the above teachings.

It may for example be understood that the coding and decoding devices described herein can be implemented in hardware, software, or a combination of hardware and software, without excluding that a single item of hardware or software can carry out several functions or that an assembly of items of hardware and software or both carry out a single function. The described method and devices may be implemented by any type of computer system or other adapted apparatus. A typical combination of hardware and software could be a general-purpose computer system with a computer program that, when loaded and executed, controls the computer system such that it carries out the method described herein. Alternatively, a specific use computer, containing specialized hardware for carrying out one or more of the functional tasks of the invention could be utilized.

The present invention can also be embedded in a computer program product, which comprises all the features enabling the implementation of the method and functions described herein and—when loaded in a computer system—is able to carry out these method and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The invention claimed is:

1. A video coding method applied to a sequence of video frames, comprising:
generating a coded bitstream including data items, each data item being described by a bitstream syntax, each of said frames comprising a luminance matrix and two chrominance matrices, said syntax including a 1-bit flag indicating, at a description level at or above the video object layer (VOL), whether the chrominance matrices are present; and
outputting the coded bitstream.

2. The method according to claim 1, wherein if said flag is set to a given value, the chrominance matrices are present and will have to be decoded at the decoding side, while both chrominance matrices are set to a monochrome constant value and do not have to be decoded if said flag is not set to said given value.

3. A video coding device of a MPEG type, comprising:
a prediction stage that defines a difference signal, the difference signal derived by subtracting from the current input signal of said device a predicted signal obtained from the previous input signal,
a coding stage that delivers a coded bitstream from said difference signal, and an inclusion stage for including in said coded bitstream, at a description level at or above the video object layer (VOL) a single 1-bit flag indicating whether the chrominance matrices are present.

4. The video coding device of claim 3, wherein if said flag is set to a given value, the chrominance matrices are present and will have to be decoded at the decoding side, while both chrominance matrices are set to a monochrome constant value and do not have to be decoded if said flag is not set to said given value.

5. A video coding device, comprising:
a generating stage for generating an output coded bitstream of a MPEG type, based on specifications of a MPEG-4 standard, and
an inclusion stage for including in the output coded bitstream, at a description level at or above the video object layer (VOL), a 1-bit flag indicating whether the chrominance matrices are present.

6. The video coding device of claim 5, wherein if said flag is set to a given value, the chrominance matrices are present and will have to be decoded at the decoding side, while both chrominance matrices are set to a monochrome constant value and do not have to be decoded if said flag is not set to said given value.

7. A computer program embedded on a tangible, non-transitory computer readable medium which, when loaded in a computer system causes the computer to transmit a video signal, said video signal including a coded bitstream including data items generated by a video coding method applied to a sequence of video frames, each data item being described by a bitstream syntax, each of said frames comprising a luminance matrix and two chrominance matrices, and a single 1-bit syntactic element indicating, at a description level at or above the video object layer (VOL), whether the chrominance matrices are present, comprising:
causing, if said 1-bit syntactic element is set to a given value, a decoding side not to decode chrominance matrices, and
setting said chrominance matrices to a monochrome constant value.

8. The computer program embedded on a tangible computer readable medium of claim 7, wherein if said syntactic element is not set to a given value, the chrominance matrices are present and will have to be decoded at the decoding side.

9. A video decoding method for decoding a transmittable video signal, comprising:
generating a coded bitstream including data items a video coding method applied to a sequence of video frames, each data item being described by a bitstream syntax, each of said frames comprising a luminance matrix and two chrominance matrices, said signal including a single 1-bit syntactic element indicating, at a description level at or above the video object layer (VOL) whether the chrominance matrices are present, and
decoding said 1-bit syntactic element.

10. The video decoding method of claim 9, wherein if said syntactic element is set to a given value, the chrominance matrices are present and will have to be decoded at the decoding side, while both chrominance matrices are set to a monochrome constant value and do not have to be decoded if said syntactic element is not set to said given value.

11. A video decoding device for decoding a transmittable video signal, comprising:
a generating stage for generating a coded bitstream including data items by a video coding method applied to a sequence of video frames, each data item being described by a bitstream syntax, each of said frames comprising a luminance matrix and two chrominance matrices, said signal including a 1-bit syntactic element for indicating, at a description level at or above the video object layer (VOL), whether the chrominance matrices are present, and
a decoding stage for decoding said 1-bit syntactic element.

12. The video decoding device of claim 11, wherein if said syntactic element is set to a given value, the chrominance matrices are present and will have to be decoded at the decoding side, while both chrominance matrices are set to a monochrome constant value and do not have to be decoded if said syntactic element is not set to said given value.

* * * * *